United States Patent
Jähnicke et al.

(10) Patent No.: US 6,999,833 B2
(45) Date of Patent: Feb. 14, 2006

(54) COMPUTER SYSTEM FOR REALTIME AND NON-REALTIME PROGRAMS

(75) Inventors: Jens Jähnicke, Dresden (DE);
Rolf-Dieter Pavlik, Erlangen (DE);
Manfred Zäh, Forchheim (DE)

(73) Assignee: Siemens Aktiengesellschaft, München (DE)

( * ) Notice: Subject to any disclaimer, the term of this patent is extended or adjusted under 35 U.S.C. 154(b) by 142 days.

(21) Appl. No.: 10/678,597

(22) Filed: Oct. 3, 2003

(65) Prior Publication Data
US 2004/0128006 A1 Jul. 1, 2004

(30) Foreign Application Priority Data
Oct. 7, 2002 (DE) .............................. 102 46 746

(51) Int. Cl.
*G06F 11/00* (2006.01)
(52) U.S. Cl. .................. 700/109; 700/110; 713/400
(58) Field of Classification Search ............. 700/11, 700/110, 109; 713/400
See application file for complete search history.

(56) References Cited

U.S. PATENT DOCUMENTS

| 6,185,477 B1 * | 2/2001 | Palm et al. .................. 700/197 |
| 6,219,626 B1 * | 4/2001 | Steinmetz et al. .......... 702/183 |
| 6,779,174 B1 * | 8/2004 | Amrhein et al. ............ 717/131 |
| 2004/0252052 A1 * | 12/2004 | Kitatani .................. 342/357.12 |
| 2004/0252668 A1 * | 12/2004 | Ozukturk et al. ........... 370/335 |

FOREIGN PATENT DOCUMENTS
EP 1 067 448 A2 1/2001

* cited by examiner

*Primary Examiner*—Albert W. Paladini
*Assistant Examiner*—Michael D. Masinick
(74) *Attorney, Agent, or Firm*—Henry M. Feiereisen

(57) ABSTRACT

The invention provides a computer system for realtime control of machines. The computer system continually switches between a realtime programs EP providing control of peripheral devices $A_1$, $A_n$, including control and/or regulation, and other programs within the realtime clock periods. The computer system has communications system KS and a a control system SS connected to the peripheral devices $A_1$, $A_n$, particularly motor driver devices, over the communications system KS. A realtime clock signal T is generated from an independent cyclic communications clock T2 of the communications system KS, which has a communications processor KP that operates in realtime. When the control processor SP is remote from the communications processor KP, the realtime clock T may be regenerated an incoming bus clock signal B by a counter Z having upper and lower thresholds K2 and K1.

16 Claims, 2 Drawing Sheets

COMPUTER SYSTEM FOR REALTIME AND NON-REALTIME PROGRAMS

CROSS-REFERENCES TO RELATED APPLICATIONS

This application claims the priority of German Patent Application, Serial No. 102 46 746.3, filed Oct. 7, 2002, pursuant to 35 U.S.C. 119(a)–(d), the disclosure of which is incorporated herein by reference.

BACKGROUND OF THE INVENTION

The present invention relates to a computer system that continually changes off between a given realtime program and some other program. More particularly, the invention is directed to a computer system in which a clock-controlled switching signal carries on a cyclic alternation of at least one given realtime program providing realtime control operations for a peripheral device with at least one other program within each respective period of the clock signal.

Cyclical data processing is expedient for providing control and regulation functions in realtime applications. The input and output equipment of the realtime application, sensors and drivers, for example, form a control circuit. Typically, such a control circuit operates using a given constant time base, and this time base must be constant for all components of the control circuit.

Industrial control applications always connect a large number of peripheral devices. Often these devices are widespread and connected across a great distance to a controlling computer system. The data processing is then carried out using a communications system, for example over a process field bus connection. The communications system must guarantee that data is transferred in accordance with that given constant time base.

The performance of control and regulation functions within one or more realtime control programs takes place within the computer system while acyclic tasks within one or more non-realtime programs are performed: the viewing of processing data, for example.

The communications system should provide the time base for the overall process, that is, the overall process including the changes between realtime and non-realtime operations, which is the critical process management function.

European patent publication EP 1 067 448 A2 describes a computer system of the sort previously used for realtime and non-realtime programming. In this computer system a personal computer (PC) system is connected through a communications system to peripheral devices using one of the PC system's independent communications clocks, and a stronger time base clock can be generated from the communications clock.

SUMMARY OF THE INVENTION

According to one aspect of the present invention, a computer system adapted to operate at least one first realtime program and at least one other program, said computer system includes at least one realtime device control program, a control system having a control processor and adapted for controlling the operation of at least one peripheral device, a clock-controlled switching signal having a switching signal period and a switching signal pulse, and a realtime clock signal having a realtime clock period and a realtime clock pulse, wherein the computer system cyclically switches between the programs within respective realtime clock periods in response to respective switching signal pulses, and a communications system having a realtime communications processor and a cyclic communications clock that is independent of the control system, wherein the cyclic independent communications clock has a communications clock period and a communications clock pulse, wherein the communications system is adapted to generate the realtime clock signal from the communications clock signal, wherein the control system is connected with the peripheral device by the communications system so that the peripheral device is controlled in accordance with the communications clock.

The present invention resolves prior art problems by providing a computer system in which an alternation between at least on realtime program and at least one other program, either another realtime program or a non-realtime program, is continually carried out within the clock period of a given realtime clock. Each of the realtime programs provides control and regulation of peripheral devices, particularly drivers. One of the control systems associated with the computer system is connected to the peripheral devices by one of the communications systems having a cyclic communications clock that is independent of the control system.

Basically, a computer system built in the manner previously known in the art, when combined with a reliable communications clock in accordance with the invention, provides high computing capacity for realtime process control as well as supervision of realtime communications. This is goal achieved by such a computer system when it has at least one associated control processor in the control system and one communication processor that operates in real time in the communications system.

According to another feature of the present invention, acyclic communications tasks, in particular the conversion of parametric and diagnostic data, are feasible for the communications processor. Thus the control processor or processors are relieved, so that the computational performance of the computer system with regard to the handling of control and regulation functions is improved.

According to another feature of the present invention, a given realtime clock can be indirectly generated from the communications clock, in that it is first equalized with regard to the length of its clock period. Thus, as a practical matter, an equal-length real-time clock is also then maintained for the switches when normal communications clock variations in occur in the communications system.

Similarly, a switching arrangement for maintenance of the communications clock in remote control processor locations in accordance with the invention is technically utterly simple to implement. Preferably it includes a counter having a relatively high frequency compared to the communications clock and that is initiated for the first clock period by a reset. An upper and a lower comparator threshold is set for beginning the next regular communications clock period at an appointed counter state, and the counter is not resettable before reaching the lower comparator threshold. After reaching the lower comparator threshold the counter is resettable by the next incoming communications clock pulse and each realtime clock pulse of the regenerated realtime clock is produced by the counter reset process. However, reaching the upper comparator threshold also automatically resets the counter.

The switching signal is also easily produced from one such regeneration circuit design wherein a respective switching signal can be produced within a realtime clock period by a predetermined counter state that occurs below the lower comparator threshold.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
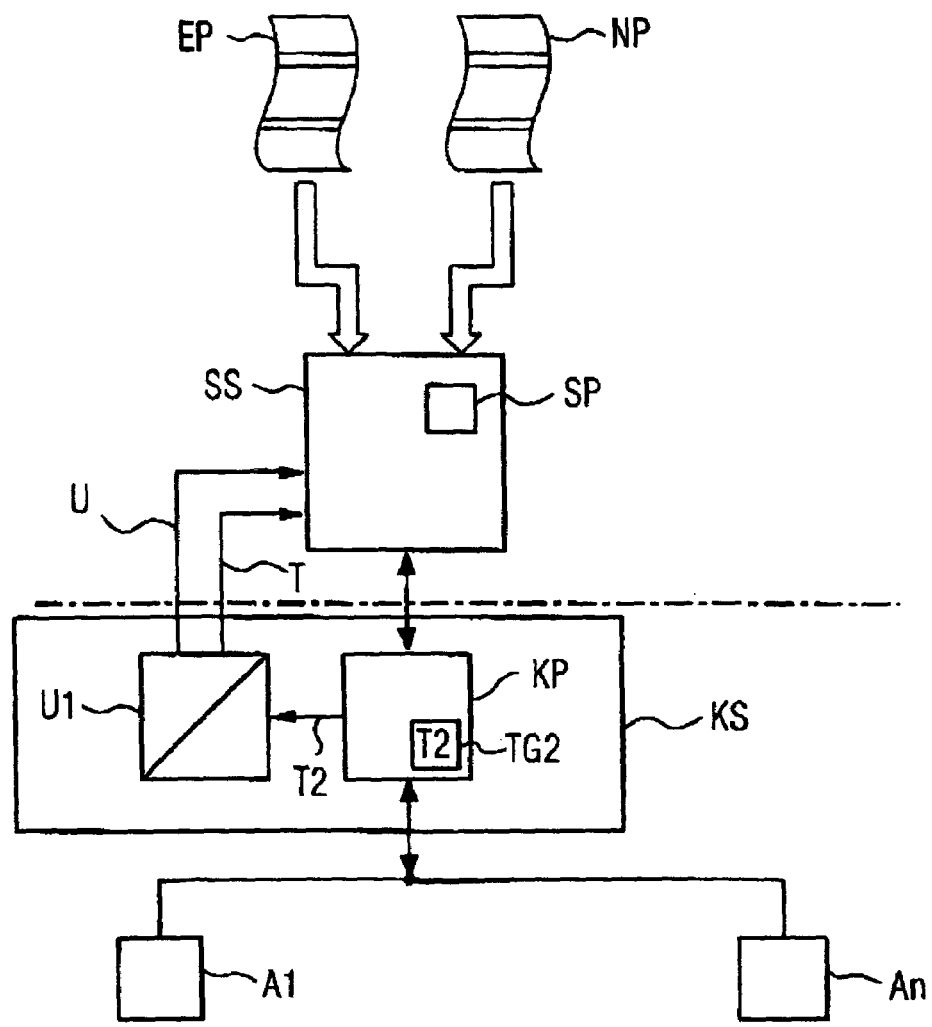
FIG. 1 is a functional block diagram of a realtime control system for peripheral devices in accordance with a preferred embodiment of the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block diagram of an overview that shows only the elements essential to the invention in this drawing. A realtime program EP and a non-realtime program NP are supplied to a control system SS having a control processor SP: The realtime program EP serves to operate particular tasks for providing driver regulation, while the non-realtime program NP can handle a display task, for example. It will be appreciated by persons skilled in the art that although only one control processor is provided in the example of an embodiment provided herein, the principles of the present invention are, of course, equally applicable to embodiments having multiple control processors. For instance a stand-alone processor may not have sufficient capacity for handling very complex and extensive control tasks.

Figure 2:
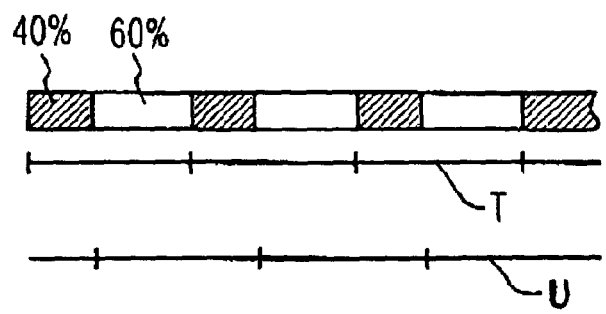
FIG. 2 is a timing diagram for the control system of FIG. 1.

In accordance with the invention, switching between realtime and non-realtime programs is implemented cyclically, as illustrated in FIG. 2. In FIG. 2, the realtime program EP is activated in the control system SS or the control processor SP at the beginning of each respective one of the equidistant realtime clock periods of the realtime clock signal T by a respective one of the realtime clock pulses, as is indicated by the shading in the bar shown in the upper part of FIG. 2.

The realtime operations are exchanged in response to the switching signal U for respective non-realtime operations. Non-realtime operations are then carried out beginning after 40% of the clock period of the realtime clock signal T has already been used by the other program, for example. The 60% portion of the realtime clock period during which the control processor carries on non-realtime operations, e.g. display tasks, is shown in the illustration in FIG. 2 by the blank portions of the bar. The switching signal U is time-delayed relative to the realtime clock signal T, which are shown in the lower portions of FIG. 2.

Referring again to FIG. 1, the dashed line in FIG. 1 indicates the functional dividing line between the control system SS and an industrial communications system KS having a realtime communications-operations processor KP overseeing the control of communications. Thus the communications processor KP can supply a control output signal from the control system SS to peripheral devices $A_1$ to $A_n$, in accordance with a communications clock T2 of the communications system KS, particularly to devices such as the drivers. Signals from peripheral devices such as sensors and measurement systems are also read in by the control system SS in accordance with the communications clock T2.

The communications processor KP has a clock source TG2 for producing a communications clock signal T2. In accordance with the invention, the control tasks and the bus clock that is produced using the communications clock pulse of the communications clock signal T2, are precisely correlated across the whole system, operations-wise.

In accordance with the invention, the realtime clock signal T and switching signal U shown in FIG. 2 are generated from the communications clock signal T2. The communications clock signal T2 is supplied by the communications processor SP to an encoder U1 that produces the realtime clock signal T and the switching clock signal U from the communications signal T2. Both of these two signals are supplied to the control system SS and operate the changeover from non-realtime to realtime and from realtime to non-realtime, respectively, through a suitable interrupt controller in the control processor SP.

The communications system KS can, however, also be located so that it is separated from the control system SS by a distance. In that case, the communications system KS can be connected to a bus connection of the control system SS over a subordinate communications bus subassembly. However, a clock signal provided by the communications processor KP from the communications clock signal T2 over that subordinate communications bus subassembly through that bus connection must be either decodable by the control processor SP from the bus clock signal B, or in some way generatable, at the other end of that subordinate communications bus subassembly, for reasons that are self explanatory.

For example, complex computer systems connected across great distances may experience significant weakening, and even a loss of the bus clock signal in some instances. Weakening or loss of the bus clock signal leads to a disruption of the communications clock signal T2 information needed by the realtime control processor SP for coordination with the corresponding realtime communications processor KP, and must be corrected.

Figure 3:
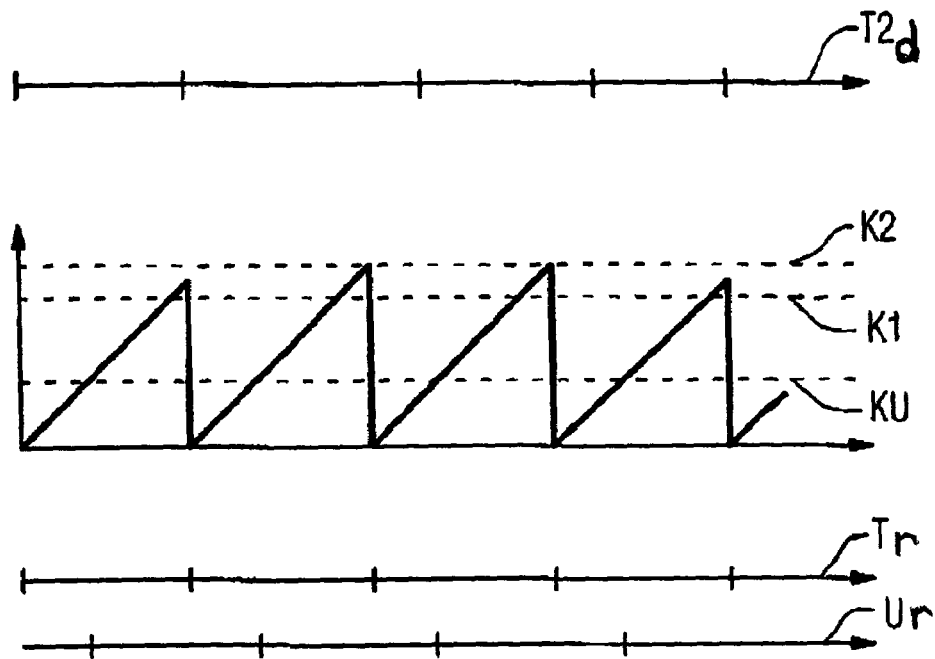
FIG. 3 is a counter-reset timing diagram in accordance with a second preferred embodiment of the invention.

Signal regeneration means can be used to assure that neither the control system SS nor the control processor SP are exposed to the effects of such weakening or disruption in the bus clock signal of such a computer system. The decoded communications clock signal $T2_d$ illustrated in FIG. 3 shows an example of the effect produced when a disrupted bus clock signal B received by a control system SS that is remote from the communications processor KP. FIG. 3 also shows means used by a method for correcting that disruption in the communications clock signal $T2_d$ in accordance with the present invention.

Figure 4:
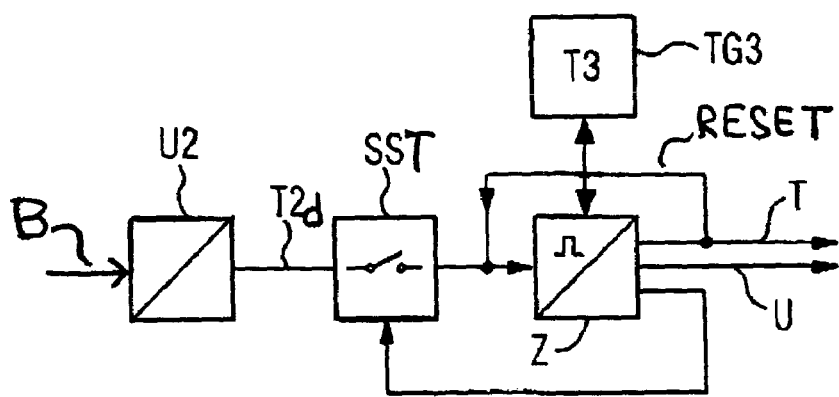
FIG. 4 is functional block diagram of a clock regeneration circuit for FIG. 3.

An example of a bus signal regeneration circuit in accordance with the invention for correcting the disruption shown in FIG. 3 is shown in FIG. 4. In this example, the decoded communications clock pulse of the communications clock signal $T2_d$ is obtained by a decoder U2 from the bus signal B of the bus system connecting the communications processor KP to the control processor SP. The decoded communications clock signal $T2_d$ provided by the decoder U2 is then supplied to a counter Z over a switch point SST while the switch point is resting in its closed position.

The counter state variable of the counter Z is counted up by a counter clock signal T3 that has a higher frequency than the frequency of the realtime clock signal T. The counter clock signal T3 is provided by a local counter-clock source TG3.

At the beginning of the first clock period of the communications clock signal $T2_d$ the counter Z and the counter clock signal T3 are reset and initialized, and the switch point SST is opened. As long as the counter state variable provided by the counter is greater than zero but still less than the lower comparator threshold K1 shown in dashes in the middle of FIG. 3, the switch point SST will remain open. However, after the counter state variable reaches the lower comparator threshold K1, the switch point SST closes again.

After the switch point SST closes again, as soon as a communications clock pulse of the decoded communications clock signal $T2_d$ is received by the counter from the decoder U2 this communications clock pulse resets the counter Z and the counter clock signal T3 and opens the switch point SST again. However, if a communications clock pulse is not promptly received after the switch point SST closes, the counter state reaches an upper comparator threshold K2, shown in dashes in the middle of FIG. 3, and that resets the counter and the counter clock signal T3 and opens the switch SST, instead. The reset of the counter that generates the realtime clock pulse is accomplished in either event.

Thus, between the two of them, the upper and lower thresholds K2 and K1 serve to correct the timing of the incoming communications clock signal. That is, whenever a reset of the counter Z occurs, the realtime clock pulse of the regenerated realtime clock signal $T_r$ is triggered. However, on the other hand, when a clock pulse from the decoded communication clock signal $T2_d$ is received from U2 after the counter state variable reaches K1 but before it has reached K2, the counter resets before the counter state variable reaches K2.

In addition, a counter state variable corresponding to the desired timing offset of the regenerated switching signal $U_r$ is defined as the comparator threshold KU. In this way, the switching signal $U_r$ used by the control system SS in this example, where that control system is remote from the respective communications system KS that might otherwise provide reliable realtime clock signal T as well as the switching signal U, another switching signal $U_r$ can be simply generated at the remote location by the same counter Z that produces the corrected realtime clock $T_r$. This regenerated switching signal's comparator threshold KU is also shown in the middle of FIG. 3.

All of these comparator thresholds K1, K2, KU, can be set as configuration values, and can be changed. However, in principle, it is also possible to provide selectable preset threshold options.

In the particular example of a disrupted decoded communications clock signal $T2_d$ shown in FIG. 3, the first (startup) communications clock pulse and the second communications clock pulse of the regenerated realtime clock signal $T_r$ are the same as the corresponding pulses of the decoded communications clock signal $T2_d$, because they are produced through a respective reset of the counter Z by the decoded communications clock signal $T2_d$, in this particular example. However, the third communications clock pulse of the decoded communications clock signal $T2_d$ arrives late in this example, so that the third realtime clock pulse of the regenerated realtime clock signal $T_r$ is produced preemptively by the counter when its counter state reaches the upper comparator threshold K2, because that counter state has already reached K2 before the third decoded communications clock pulse in this example can reach that counter Z. The same holds true for the fourth clock pulse. On the other hand, the fifth communications clock pulse of the decoded communications clock signal $T2_d$ again normally triggers the fifth realtime clock pulse of the regenerated realtime clock signal $T_r$ by resetting the counter Z before the counter state can reach K2.

In the example of a preferred embodiment illustrated herein the exchange of suitable process data through the communications processor KP, control error data for example, is preferably carried out through a dual-port RAM. The communications processor KP supervises the processing of realtime data such as measurement signals or state signals, for example, and prepares information relevant to realtime data processing. In the event of a disruption in realtime data processing, a disruption in the form of a sensor or driver failure for example, the control processor KP can initiate suitable preventive measures, such as shifting production processes. This guarantees very reliable process management in the computer system.

Additionally, the communications processor KP can perform acyclic communications tasks, such as converting parameter and diagnostic data for use by the control system SS. This relieves the control processor or processors SP of some acyclic tasks so that, in this way, the computational performance of the computer system is improved with regard to processes involved in the handling of realtime control, that is, the computational performance of the computer system is improved with regard to realtime control and regulation functions.

The realtime behavior of this computer system is essentially the result of the coordination of the processors, KP, KS, of the communications systems KS and the control systems SS. In the event that the communications processor KP happens to be close to the control processor SP, the communications processor KP can directly provide the realtime clock to the control processor SP over short data connections. Alternatively, in the event that the control processor SP happens to be located far from the communications processor KP, the realtime clock signal can be regenerated from the bus signal, as in the example of a regeneration circuit in accordance with the present invention that is provided above, for example.

In the event that very complex or numerous control or regulatory functions are processed, under these circumstances, because of the processing load involved, it is important to note that such tasks can be shared among multiple control processors SP in accordance with the invention. Furthermore, in accordance with the invention, each control processor SP can process both realtime and non-realtime data.

The realtime operation of a stand-alone control processor can also be synchronized or clocked by a bus signal produced by the communications processor KP in accordance with the invention. A realtime-capable computer system having higher computing capacity can be implemented in this manner, as described above. Furthermore, it is conceivable that, through this improvement, the realtime clock could also be used to switch between different realtime programs in accordance with the invention. In this situation, the supervision of realtime processing provided by the communications processor KP has a particularly positive effect in that it also reduces the consequences of processor failure in a stand-alone control processor. For example, the failure of that one control processor can easily be reported to other control processors connected to the communications processor KP, so that the failure of the one processor is compensated by suitable action within that computer system that is coordinated by the communications processor in accordance with the present invention.

While the invention has been illustrated and described in connection with currently preferred embodiments shown and described in detail above, it is not intended to be limited to the details shown, since various modifications and structural changes may be made without departing in any way from the spirit of the invention. These embodiments were chosen and described for the purpose of providing the best explanation of the principles of the invention and its practical applications, so as to enable a person skilled in the art to best utilize the present invention in such other embodiments and with such various modifications as are suited to the particular use contemplated by that person.

What is claimed as new and desired to be protected by Letters Patent is set forth in the appended claims and includes equivalents of the elements recited therein.

What is claimed is:

1. A computer system adapted to operate at least one first realtime program and at least one other program, said computer system comprising:
    at least one realtime device control program;
    a control system having a control processor, said control system being adapted for controlling the operation of at least one peripheral device;
    a clock-controlled switching signal having a switching signal period and a switching signal pulse, and a realtime clock signal having a realtime clock period and a realtime clock pulse, said computer system cyclically switching between said programs within respective realtime clock periods in response to respective switching signal pulses;
    a communications system having a realtime communications processor and a cyclic communications clock that is independent of the control system, said cyclic independent communications clock being adapted to produce a communications clock signal having a communications clock period and a communications clock pulse, said communications system being adapted to generate said realtime clock signal from said communications clock signal, said control system being connected with said peripheral device by said communications system so that said peripheral device is controlled in accordance with said communications clock; and
    at least one acyclic task in said other program, said communications processor being adapted to carry out said acyclic task.

2. The computer system of claim 1, wherein said acyclic task is a conversion of parametric data.

3. The computer system of claim 1, wherein said acyclic task is a conversion of diagnostic data.

4. The computer system of claim 1, wherein said control processor is adapted to operate said first realtime program for controlling the operation of at least one peripheral device.

5. The computer system of claim 4, wherein said control processor is adapted to operate the other program.

6. The computer system of claim 5, wherein said other program is a non-realtime program.

7. The computer system of claim 5, wherein said other program is a second realtime program.

8. The computer system of claim 1, and further comprising means for generating said clock-controlled switching signal using said communications clock so that said clock-controlled switching signal has a predetermined time relationship to said realtime clock signal.

9. The computer system of claim 1, wherein said realtime clock signal is indirectly generated from said communications clock signal so that initially said realtime clock periods and said communications clock periods are equalized with respect to each other.

10. The computer system of claim 9, and further comprising a counter having a higher clock frequency than the communications clock frequency and having a counter state, said counter being adapted to be initialized by a reset during a first communications clock period; and a lower and an upper comparator threshold for beginning the next regular communications clock pulse at an appointed counter state, said counter being not resettable below said lower comparator threshold, said counter being adapted to be resettable by the next incoming communications clock pulse after said counter state has reached said lower comparator threshold and to be automatically reset if said counter state reaches said upper comparator threshold, said counter being adapted to generate a realtime clock pulse upon being reset.

11. The computer system of claim 10, and further comprising an additional comparator threshold responsive to a counter state below said lower comparator threshold, said counter being adapted to generate a switching signal pulse within a realtime clock period when said counter state reaches said additional comparator threshold.

12. An industrial machine having a computer system adapted to operate at least one first realtime program and at least one other program, said computer system comprising:
    at least one realtime device control program;
    a control system having a control processor, said control system being adapted for controlling the operation of at feast one peripheral device;
    a clock-controlled switching signal and a realtime dock signal, said computer system continually switching between said programs within said realtime clock period in response to said clock-controlled switching signal;
    a communications system having a realtime communications processor and a cyclic communications clock that is independent of the control system, said cyclical communications clock being adapted to produce a communications clock signal, said control system being connected with said peripheral device by said communications system, said communications system being adapted to generate said realtime clock signal from said communications clock signal; and
    at least one acyclic task in said other program, said communications processor being adapted to carry out said acyclic task.

13. The industrial machine of claim 12, wherein the machine is a machine tool and the peripheral device is a machine tool device.

14. The industrial machine of claim 12, wherein the machine is a plastics processing machine and the peripheral device is a plastics processing machine.

15. The industrial machine of claim 12, wherein the machine is a robot and the peripheral device is a robot device.

16. The computer system of claim 1, wherein said cyclic independent communications clock is in said realtime communications processor.

* * * * *

UNITED STATES PATENT AND TRADEMARK OFFICE
CERTIFICATE OF CORRECTION

PATENT NO. : 6,999,833 B2
DATED : February 14, 2006
INVENTOR(S) : Jens Jähnicke et al.

It is certified that error appears in the above-identified patent and that said Letters Patent is hereby corrected as shown below:

Column 8,
Line 37, change "feast" to -- least --.
Line 38, change "dock" to -- clock --.

Signed and Sealed this

Twenty-third Day of May, 2006

JON W. DUDAS
*Director of the United States Patent and Trademark Office*